A. P. KOFOED AND N. P. NIELSEN.
TUBE STOPPER.
APPLICATION FILED MAR. 19, 1919.
1,335,117.
Patented Mar. 30, 1920.
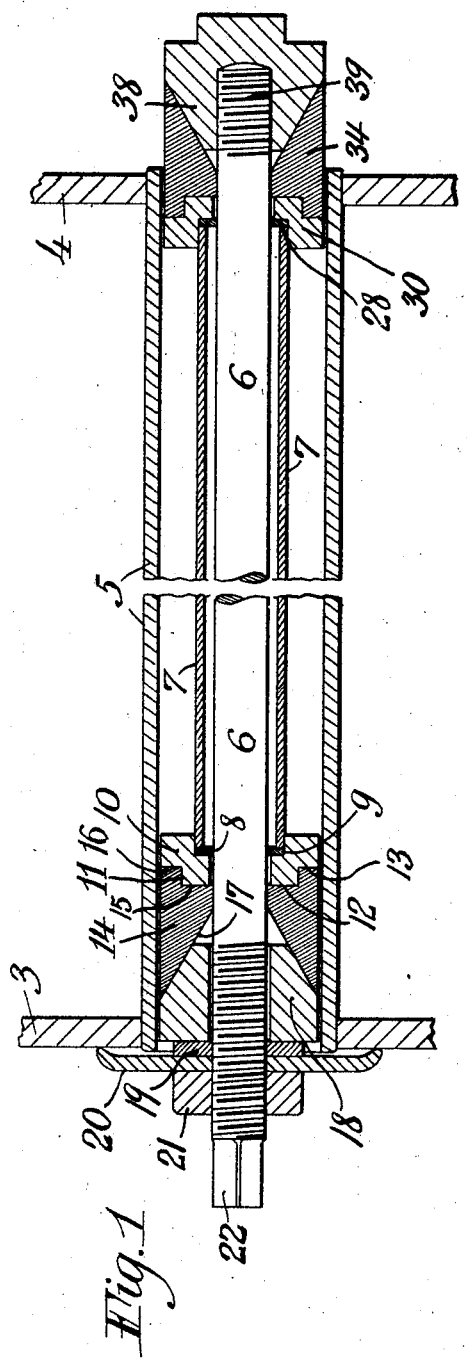
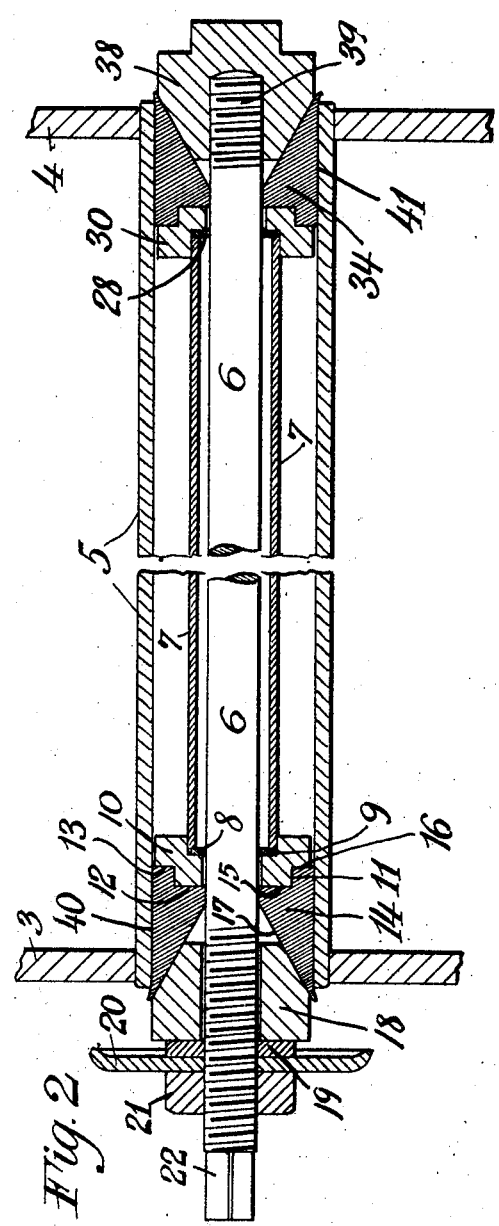
INVENTORS
Axel P. Kofoed & Niels P. Nielsen
BY
Ivan E. G. Konigeley
ATTORNEY

UNITED STATES PATENT OFFICE.

AXEL P. KOFOED AND NIELS P. NIELSEN, OF COPENHAGEN, DENMARK.

TUBE-STOPPER.

1,335,117.　　　　Specification of Letters Patent.　　Patented Mar. 30, 1920.

Application filed March 19, 1919. Serial No. 283,553.

*To all whom it may concern:*

Be it known that we, AXEL P. KOFOED and NIELS P. NIELSEN, citizens of the Danish monarchy, residing at Copenhagen, Denmark, have invented certain new and useful Improvements in Tube-Stoppers, of which the following is a specification.

This invention relates to improvements in stoppers for boiler and other tubes. The object of the invention is to provide a stopper for a leaky or ruptured boiler tube whereby the same may be quickly closed without the necessity of closing down the boiler or other apparatus, to which the tube belongs.

One object of the invention is to provide a tube stopper of improved, efficient and practical construction which may be produced at a relatively low cost of manufacture.

Another object of the invention is to provide a tube stopper adapted to close both ends of a leaky tube by a single operation.

With the above and other objects in view, the invention consists in a tube stopper as hereinafter described and as illustrated in the accompanying drawing, in which—

Figure 1 is a sectional view of a tube stopper embodying the invention showing it in position in a tube immediately after it has been placed therein and prior to the closing of the tube;

Fig. 2 is a similar view showing the stopper in position closing the ends of the tube.

In the drawing, the reference numeral 3 denotes the front tube sheet of a boiler and 4 the rear sheet. 5 denotes the tube. The stopper comprises a central bolt or general supporting element 6 which is surrounded by a cylinder or tube 7. The front end of the tube 7 rests against a packing 8 within a recess 9 in a thrust collar 10 which is offset as at 11 to form the plane surfaces 12 and 13. 14 is an expansible closure member preferably of lead or similar suitable material having the plane surfaces 15 and 16 adapted to coöperate with the surfaces 12 and 13 aforesaid. The closure member or lead packing 14 is provided with an inner cone shaped recess 17 and said member 14 is adapted to be expanded by the expanding cone member 18 loosely supported on the bolt 6. 19 denotes a washer interposed between the expanding member 18 and a shield 20. 21 is a nut in threaded engagement with the bolt 6, which is squared as at 22.

The rear end of the stopper near the tube sheet 4 is provided with the packing 28, thrust collar 30 and lead packing 34 corresponding to the similar elements 8, 10 and 14 aforesaid. The expanding member 38 is cone shaped like the member 18 and is fast on the bolt 6 as by being screwed thereon for which purpose the bolt 6 is threaded as at 39. But any other means of securing the expander 38 to the bolt 6 may be employed.

It will be noted that only the expander 38 is secured to the bolt 6. All the other elements are loose on the bolt which makes it easy to assemble the parts and also cheapens the manufacture. The nut 21, as stated, is of course threaded onto the bolt.

In operation when a leaky tube has been discovered, the stopper is thrust into the tube as shown in Fig. 1, where it will be observed that the shield or guard 20 effectively temporarily closes the front end of the leaky tube and thus permits the workman to operate the stopper without getting his hands and face scalded by the steam and water pouring out from the leaky tube. Thereafter the bolt 6 is held firmly by applying a wrench to the squared portion 22 while another wrench is used on the nut 21 to tighten it. At the same time, the stopper is withdrawn slightly to the position shown in Fig. 2. The nut 21 is then screwed home, whereby the expander 18 is forced into the packing 14 expanding the latter and at the same time forcing it against the thrust collar 10. The latter presses the packing 8 against the tube 7 which in turn transmits the pressure to packing 28, collar 30 and main packing 34 forcing the latter onto the expander 38. When finally the nut 21 has been screwed up tight, it will be seen, that the two main packings 14 and 34 have been expanded on their respective expanders 18 and 38 closing the tube tightly as at 40 and 41 in Fig. 2, and that tight closure has also been effected between the coöperating surfaces of the thrust collars 10 and 30 and the packings as well as between the packings 8 and 28 and the tube 7. Thus complete closure is effected at both ends of the leaky tube, by the single operation of screwing home the nut 21. And of course, by loosening said nut, the stopper is quickly released and removed from the tube 5.

It will be observed that the tube stopper as herein disclosed is composed of few parts, largely duplicates which makes for accuracy and cheapness in manufacture. The stopper has been tested practically and is easily operated. The shield 20 is especially noteworthy as affording protection and it will also be observed that the closure of the tube is effected by surface contact throughout.

What we claim is:

1. A tube stopper comprising a bolt, an expanding head fixed to said bolt at its inner end, a second expanding head slidably carried by said bolt at its outer end, expansible packing elements adjacent said expanding heads, said packing elements having a plurality of plane surfaces, thrust collars adjacent said packing elements, said thrust collars having a plurality of plane surfaces adapted to coact with the plane surfaces on the said packing elements to afford tight closure, a cylinder surrounding said bolt, the ends of said cylinder being seated in recesses formed in the said thrust collars, packings in said recesses, a nut on said bolt for operating said expanding head, a guarding shield carried on said bolt behind the said nut, said guarding shield being adapted to temporarily close the opening of the tube to be stopped, and means on said bolt for keeping the same immovable while said nut is being operated.

2. A tube stopper comprising a bolt, an expanding head fixed to said bolt at its inner end, an inner packing adapted to be forced onto said expanding head, an outer packing, an outer expanding head slidably mounted on said bolt and adapted to be forced into said outer expansible packing, thrust collars adjacent said packings, means between said thrust collars for transmitting the force when the outer packing is expanded to the inner packing, a guarding shield loosely carried by said bolt in front of said outer packing, said guarding shield being of substantially larger diameter than the tube to be stopped and adapted to temporarily close the opening thereof, a square portion formed on said bolt for holding it immovable while the packings are expanded and a nut for operating the outer expanding head to expand the said packings.

In testimony whereof, we have signed our names to this specification, this 5th day of March, 1919.

AXEL P. KOFOED.
NIELS P. NIELSEN.